United States Patent
Baten et al.

(10) Patent No.: US 9,091,215 B2
(45) Date of Patent: Jul. 28, 2015

(54) SYSTEM FOR VENTILATING A GAS TURBINE ENCLOSURE

(75) Inventors: Robert Allen Baten, Baytown, TX (US); David Joseph Drobniak, Houston, TX (US); Harley Matthew Ross, Pearland, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 845 days.

(21) Appl. No.: 13/171,265

(22) Filed: Jun. 28, 2011

(65) Prior Publication Data

US 2013/0005237 A1    Jan. 3, 2013

(51) Int. Cl.
  *F24F 7/06*   (2006.01)
  *F24F 7/007*  (2006.01)
  *F02C 3/32*   (2006.01)
  *F02C 7/12*   (2006.01)

(52) U.S. Cl.
CPC ... *F02C 3/32* (2013.01); *F02C 7/12* (2013.01); *Y02E 20/16* (2013.01)

(58) Field of Classification Search
CPC ............ F01D 25/12; F01D 25/14; F24F 7/08; Y02B 30/16; F02C 3/32; F02C 7/12; Y02E 20/16
USPC .................................. 454/252; 60/226.1, 262
See application file for complete search history.

(56) References Cited

U.S. PATENT DOCUMENTS

| | | | | |
|---|---|---|---|---|
| 4,128,769 A * | 12/1978 | Bons et al. | | 290/52 |
| 4,285,194 A * | 8/1981 | Nash | | 60/762 |
| 4,555,902 A * | 12/1985 | Pilarczyk | | 60/39.5 |
| 5,236,393 A * | 8/1993 | Milewski | | 454/266 |
| 5,450,719 A * | 9/1995 | Marsh | | 60/806 |
| 5,632,142 A * | 5/1997 | Surette | | 60/772 |
| 5,960,887 A * | 10/1999 | Crabtree | | 169/15 |
| 6,082,094 A * | 7/2000 | Longardner et al. | | 60/801 |
| 6,134,878 A * | 10/2000 | Amako et al. | | 60/801 |
| 6,273,810 B1 * | 8/2001 | Rhodes et al. | | 454/120 |
| 6,357,221 B1 * | 3/2002 | Schroeder et al. | | 60/797 |
| 6,358,109 B1 * | 3/2002 | Neisen | | 440/89 R |
| 6,412,284 B1 * | 7/2002 | Horner | | 60/772 |
| 6,470,689 B2 * | 10/2002 | Schroeder et al. | | 60/796 |
| 6,477,843 B2 * | 11/2002 | Schroeder et al. | | 60/772 |
| 6,599,083 B2 * | 7/2003 | Belzner et al. | | 415/1 |
| 6,615,576 B2 * | 9/2003 | Sheoran et al. | | 60/39.5 |
| 6,798,079 B2 * | 9/2004 | Nelson et al. | | 290/2 |
| 6,983,607 B2 * | 1/2006 | Grove et al. | | 60/797 |
| 7,152,410 B2 * | 12/2006 | Sheoran et al. | | 60/782 |
| 7,364,117 B2 * | 4/2008 | Dionne | | 244/58 |
| 7,373,779 B2 * | 5/2008 | Czachor | | 60/772 |
| 7,431,270 B2 | 10/2008 | Mockry | | |
| 8,529,202 B2 * | 9/2013 | Zhang | | 415/177 |
| 8,556,027 B2 * | 10/2013 | Francisco et al. | | 181/213 |
| 2010/0005806 A1 * | 1/2010 | Donnelly | | 60/770 |
| 2012/0073215 A1 * | 3/2012 | Zhang et al. | | 52/79.9 |

OTHER PUBLICATIONS

Opinion Notice for First Examination for Application No. 201210346642.8 mailed May 5, 2015, including the English translation.

* cited by examiner

*Primary Examiner* — Steven B McAllister
*Assistant Examiner* — Jonathan Cotov
(74) *Attorney, Agent, or Firm* — Fletcher Yoder, P.C.

(57) ABSTRACT

A turbine ventilation system includes at least one fan configured to provide a first air flow into a gas turbine enclosure, a fan bypass configured to circumvent the at least one fan to provide a second air flow into the gas turbine enclosure, and an eductor configured to draw the first or second air flows through and out of the gas turbine enclosure.

11 Claims, 5 Drawing Sheets

SYSTEM FOR VENTILATING A GAS TURBINE ENCLOSURE

BACKGROUND OF THE INVENTION

The subject matter disclosed herein relates to systems for ventilating a gas turbine enclosure.

Gas turbine generators are often used to produce electricity for a power grid. The gas turbine generators are typically stationary units disposed in a power plant, such as an integrated gasification combined cycle (IGCC) power plant. However, the gas turbine generators also may be used in mobile units, such as large trailers. The gas turbine generators typically include a gas turbine enclosed within an enclosure. In order to avoid the buildup of heat around the gas turbine engines, the gas turbine generators include ventilation systems to carry the heat away from the gas turbine engines. Unfortunately, the designs of the ventilation systems may limit the use of the gas turbine generators to environments within certain ambient temperature ranges and increase the operating costs of the gas turbine generators. Furthermore, the ventilation systems may draw a considerable amount of power, and thus reduce the efficiency of the gas turbine generators.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a gas turbine enclosure and a gas turbine engine disposed in the gas turbine enclosure, wherein the gas turbine engine is configured to output an exhaust flow. The system also includes a ventilation system coupled to the gas turbine enclosure. The ventilation system includes at least one fan configured to provide a first air flow into the gas turbine enclosure, a fan bypass configured to circumvent the at least one fan to provide a second air flow into the gas turbine enclosure, and an exhaust driven eductor configured to draw the first and or second air flows through and out of the gas turbine enclosure using the exhaust flow.

In accordance with a second embodiment, a system includes a turbine ventilation system. The turbine ventilation system includes at least one fan configured to provide a first air flow into a gas turbine enclosure, a fan bypass configured to circumvent the at least one fan to provide a second air flow into the gas turbine enclosure, and an eductor configured to draw the first or second air flows through and out of the gas turbine enclosure.

In accordance with a third embodiment, a system includes a gas turbine controller. The gas turbine controller includes a turbine purge logic configured to activate at least one fan to purge a gas turbine enclosure disposed about a gas turbine engine. The gas turbine controller also includes a turbine ventilation logic configured to activate a fan bypass to circumvent the at least one fan to ventilate the gas turbine enclosure using an exhaust driven eductor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
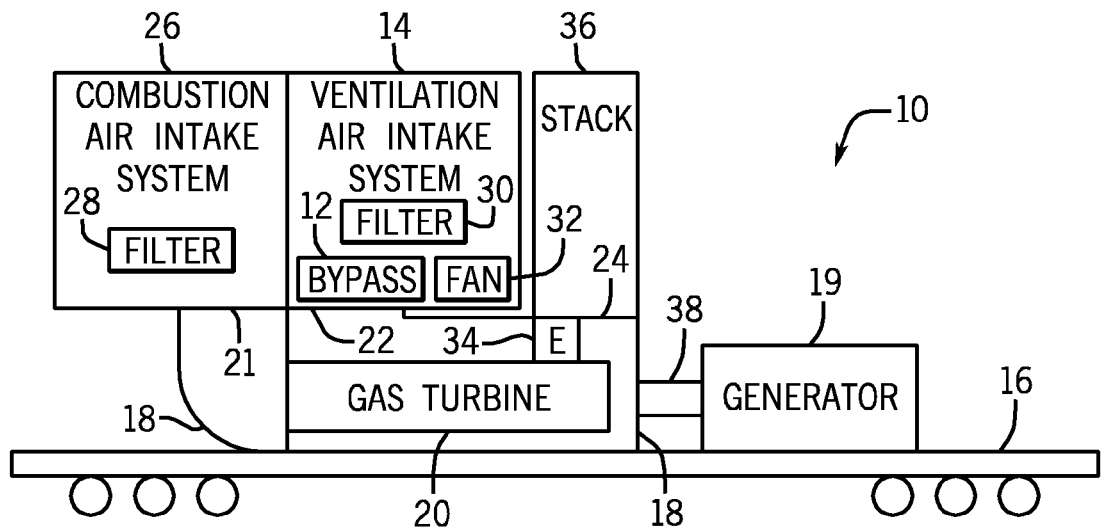
FIG. 1 is a schematic side view of an embodiment of a gas turbine generator having a bypass for a ventilation system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to systems for ventilating enclosures that surround gas turbine engines. In order to avoid the buildup of heat around a gas turbine engine within an enclosure, a gas turbine system may include a ventilation air intake system to purge and ventilate heat and exhaust products out of the gas turbine enclosure. In the disclosed embodiments, the ventilation air intake system functions in conjunction with an eductor to both purge and ventilate the gas turbine enclosure, thereby suctioning or drawing an air flow through the enclosure without requiring a fan. Embodiments of the present disclosure provide a system that includes a ventilation system coupled to the gas turbine enclosure. The ventilation system includes one or more fans that operate to generate an air flow to purge the gas turbine enclosure (e.g., during startup of the gas turbine engine). In addition, the ventilation system includes a bypass to circumvent the one or more fans to provide additional air flow into the gas turbine enclosure for ventilation (e.g., after the purging of the gas turbine enclosure). Further, the ventilation system includes an eductor that uses the exhaust flow generated by the gas turbine engine to suction or draw the air flow provided by the fan and/or bypass through and out of the gas turbine enclosure. In some embodiments, the bypass may include an actuator to open and close a valve. In other embodiments, the ventilation system may include a controller that includes logic to control both the bypass and the one or more fans. These systems are designed to increase the efficiency of the ventilation system, reduce the size of the fans employed in purging the gas turbine enclosure to reduce initial unit cost, to eliminate the use of the fans subsequent to purging the gas turbine enclosure to reduce operating cost, and to allow the use of the gas turbine systems in higher ambient temperature environments.

FIG. 1 is a schematic side view of an embodiment of a gas turbine generator 10 (e.g., gas turbine system) having a bypass 12 for a ventilation air intake system 14. The bypass 12, in various embodiments, has applicability for any gas turbine, including both stationary and mobile gas turbine power generation units. As illustrated, the gas turbine generator 10 includes a mobile gas turbine power generation unit. The power generation unit 10 includes a trailer 16, a gas turbine enclosure 18 that houses a gas turbine engine 20 on the trailer 16, and an electrical generator 19 driven by the gas turbine engine 20 on the trailer 16. The gas turbine enclosure 18 defines a first intake port 21 (e.g., first air intake port or turbine air intake), a second intake port 22 (e.g., second air intake port or enclosure ventilation intake), and an air exit port 24 (e.g., eductor ventilation port). The first intake port 21 is coupled to a combustion air intake system 26 upstream from the gas turbine engine 20. The combustion air intake system 26 includes one or more filters 28 to filter air provided to the gas turbine engine 20. The first intake port 21 directs air into the gas turbine engine 20. For example, the first intake port 21 may direct air into a compressor of the gas turbine engine 20. For example, the gas turbine engine 20 may compress the air from port 21, mix the air with fuel, and combust the air-fuel mixture to drive one or more turbines. The second intake port 22 is coupled to the ventilation air intake system 14. The ventilation air intake system 14 includes one or more filters 30 to filter air provided to the enclosure 18 of the gas turbine 20. The ventilation air intake system 14 provides air into the enclosure 18 via one or more fans 32 and/or a bypass 12 (e.g., fan bypass). The second intake port 22 directs air into the enclosure 18 surrounding the gas turbine 20 to externally cool the turbine 20 and/or the surrounding volume in the enclosure 18. The enclosure 18 includes an eductor 34 to draw or suction air flow from the ventilation air intake system 14 through and out of the enclosure 18 at the exit port 24 using exhaust flow generated by the gas turbine 20. The exit port 24 is coupled to an exhaust stack 36 for venting exhaust gases from the gas turbine 20 and air from the enclosure 18. The gas turbine 20 includes a drive shaft 38 that extends through the enclosure 18 and couples to the generator 19.

Stationary and mobile gas turbine power generation units 10 are generally maintained within certain temperature ranges, e.g., certain ambient temperature ranges, to protect the units 10 from overheating. Stationary gas turbine power generation units 10 may be located within a power plant, while mobile gas turbine power generation units 10 may be located at locations subject to natural disasters, brownouts, blackouts, or other power outages. Regardless of the locale, in order to avoid the buildup of heat around the gas turbine engines 20, the gas turbine generators 10 include ventilation systems to carry the heat away from the enclosures 18 surrounding the gas turbine engines 20. Unfortunately, certain ventilation systems may limit the use of the gas turbine generators 10 to environments within certain ambient temperature ranges and/or increase the operating costs of the gas turbine generators 10. As discussed below, the disclosed embodiments of ventilation systems 14 include the bypass 12 to enable additional air flow into the gas turbine enclosure 18 to ventilate the enclosure 18 to cool the gas turbine engines 20. The bypass 12 may include an actuator (e.g., a drive or biasing element) coupled to a valve or damper (e.g., a plate, one or more doors, or a louver) to control air flow through the bypass 12. The eductor 34 draws or suctions the air flow (via the bypass 12 and/or fans 32) through and out of the enclosure 18 into a turbine exhaust flow. In particular, the eductor 34 enables a ventilation air flow with or without fans 32, because the eductor 34 drives the ventilation air flow due to negative pressure or suction created by the passing exhaust flow. As a result, while the gas turbine engine 20 is operating to generate the exhaust flow, the eductor 34 drives the ventilation air flow without requiring operation of the fan 32. Thus, energy is saved by shutting off the fan 32. In addition, the ventilation air flow generated by the eductor 34 is substantially increased by opening the bypass 12, which reduces the pressure drop and restriction to ventilation air flow. The bypass 12, in conjunction with the eductor 34, increases the range of ambient temperatures that the gas turbine generators 10 may operate in and decreases the overall operating costs for the generators 10.

Figure 2:
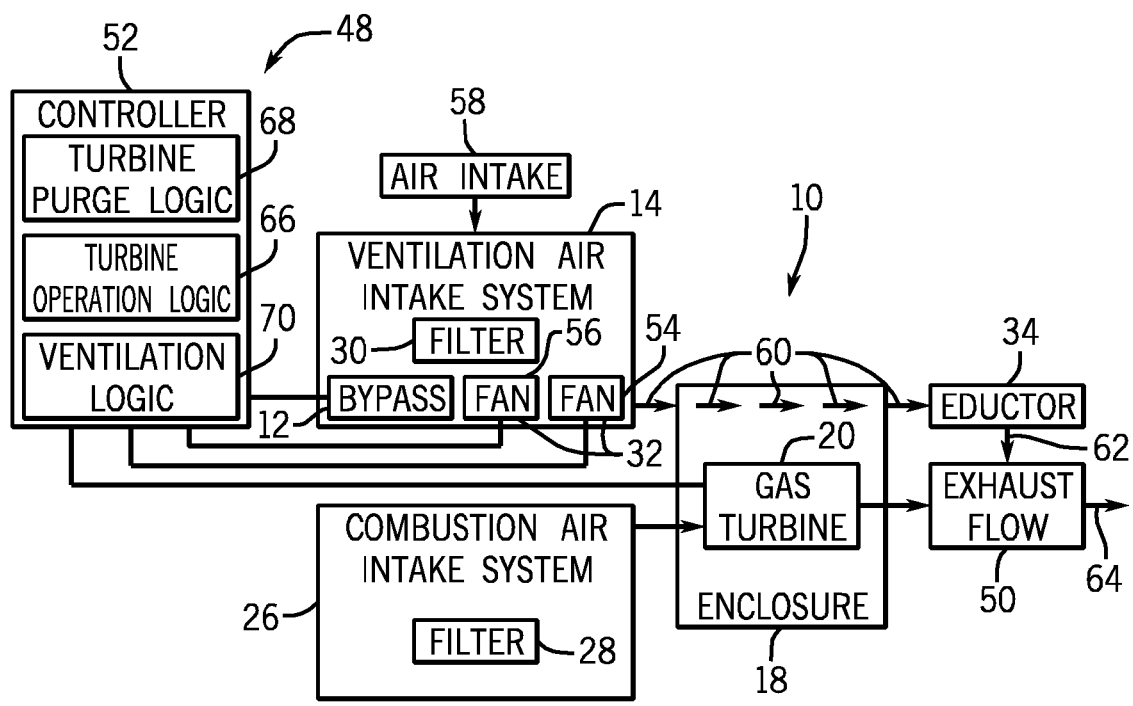
FIG. 2 is a schematic block diagram of an embodiment of a ventilation system for a gas turbine system.

FIG. 2 is a schematic block diagram of an embodiment of a ventilation system 48 for the gas turbine system 10. As mentioned above, the gas turbine system 10 may be stationary or mobile. The gas turbine system 10 is as generally described in FIG. 1. The gas turbine engine 20 is disposed within the enclosure 18. The gas turbine engine 20 receives filtered air from the combustion air intake system 26 having one or more filters 28. The gas turbine engine 20 is configured to receive the air from the combustion air intake system 26 compress the air, mix the air with fuel, combust the air-fuel mixture, drive one or more turbines, and output an exhaust flow 50. Additionally, the gas turbine system 10 is coupled to the ventilation system 48 (e.g., turbine ventilation system). The ventilation system 48 includes the ventilation air intake system 14, a controller 52 (e.g., gas turbine controller) configured to control both the gas turbine engine 20 and the ventilation air intake system 14, and the eductor 34 to drive air flow from the ventilation air intake system 14 through and out of the enclosure 18. As mentioned above, the ventilation air intake system 14 includes one or more filters 30, one or more fans 32 (e.g., fans 54 and 56), and the bypass 12 (e.g., fan bypass). The ventilation air intake system 14 is configured to intake air 58, filter the air via the filters 30, and to direct air flow (as indicated by arrows 60) via the bypass 12 and/or at least one fan 32 into the enclosure 18 to both purge and ventilate heat and exhaust products out of the enclosure 18. The eductor 34 is configured to draw the air flow from the enclosure 18 into the exhaust flow 50 (as indicated by arrow 62) output from the gas turbine engine 20 into, for example, the exhaust stack as indicated by arrow 64.

The controller 52 includes logic (e.g., instructions stored on a non-transitory tangible computer readable medium) configured to control the operations of the gas turbine engine 20 and the ventilation system 48. For example, the controller 52 includes a turbine operation logic 66 configured to control a startup procedure, normal operation procedure, and a shutdown procedure of the gas turbine engine 20. Also, the controller 52 includes a turbine purge logic 68 configured to activate at least one fan 32 to purge the gas turbine enclosure 18 disposed about the gas turbine engine 20. For example, the turbine purge control logic 18 is configured to activate the at least one fan 32 to purge the gas turbine enclosure 18 upon activation of a startup sequence (e.g., via the turbine operation logic 66) and prior to ignition of the gas turbine engine 20, while the fan bypass 12 remains in a closed position. In certain embodiments, the turbine purge control logic 68 is configured to activate the at least one fan 32 to purge the gas turbine enclosure 18 at least prior to the startup sequence, while the fan bypass 12 remains in a closed position. Further, the controller 52 includes a turbine ventilation logic 70 configured to activate (e.g., open) the fan bypass 12 to circumvent the at least one fan 32 to ventilate the gas turbine enclosure 18 using the exhaust driven eductor 34. For example, the turbine ventilation logic 70 is configured to deactivate the at least one fan 32 and open the fan bypass 12 after the purge of the gas turbine enclosure 18. In certain embodiments, the controller 52 may be coupled to one or more actuators or drives, which in turn couple to a valve or damper (e.g., one or more doors or louvers) of the bypass 12. In some embodiments, the controller 52 forms part of the bypass 12. In other embodiments, the controller 52 is separate from the bypass 12. As a result of this logic, the ventilation system 48 increases the range of ambient temperatures that the gas turbine system 10 may operate in and decreases the overall operating costs for the system 10.

Figure 3:
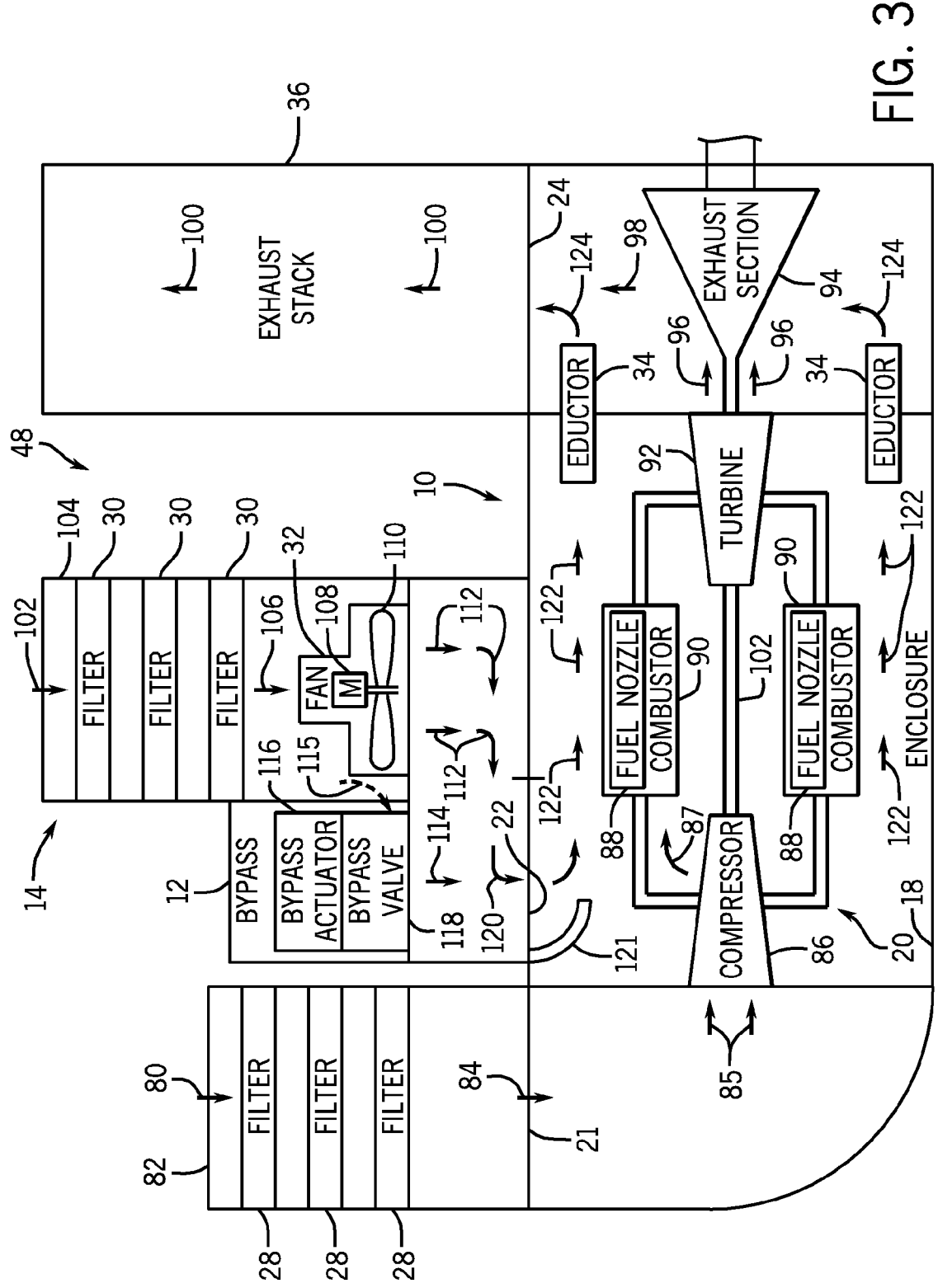
FIG. 3 is a detailed schematic view of an embodiment of the ventilation system for the gas turbine system.

FIG. 3 provides further details as to the overall operation of the ventilation system 48 in conjunction with the gas turbine system 10. FIG. 3 is a detailed schematic view of an embodiment of the ventilation system 48 for the gas turbine system 10. The ventilation system 48 and the gas turbine system 10 are as generally described in FIGS. 1 and 2. The gas turbine system 10 includes the gas turbine engine 20 disposed in the enclosure 18. Air flows through an opening 82 into the combustion air intake system 26, as indicated by arrow 80 and flows through a plurality of filters 28 configured to filter the air. The air enters the enclosure 18 via the first air intake port 21, as indicated by arrow 84. The enclosure 18 directs the air 85 towards the gas turbine engine 20. The gas turbine engine 20 intakes the air 85 at a compressor 86, which compresses the air and directs compressed air 87 to one or more fuel nozzles and combustor 90. The fuel nozzles 88 intake and mix fuel with the compressed air 87, and distribute the air-fuel mixture into the one or more combustors 90 in a suitable ratio for combustion. In certain embodiments, each combustor 90 includes one or more fuel nozzles 88. The air-fuel mixture combusts in a chamber within each combustor 90, thereby creating hot pressurized exhaust gases. Each combustor 90 directs the exhaust gases through a turbine 92 toward an exhaust section 94 as indicated by arrows 96. The exhaust section 94 directs the exhaust gases towards the exhaust stack 36, as indicated by arrow 98, through the exit port 24. The exhaust stack 36 vents the exhaust gases from the gas turbine engine 20 as indicated by arrows 100. As the exhaust gases pass through the turbine 92, the gases force turbine blades to rotate a shaft 102 along an axis of the gas turbine engine 20. As illustrated, the shaft 102 may be connected to various components of the gas turbine engine 20, including the compressor 86. The compressor 86 also includes blades coupled to the shaft 102. As the shaft 102 rotates, the blades within the compressor 86 also rotate, thereby compressing air from an air intake (via the combustion air intake system 26) through the compressor 86 and into the fuel nozzles 88 and/or combustors 90. The shaft 102 may also be connected to a load, such as an electrical generator in an electrical power plant, for example.

As mentioned previously, air also enters the enclosure via the second air intake port 22 via the ventilation air intake system 14 coupled to the enclosure 18. As illustrated, air flows through an opening 104 into the ventilation air intake system 14 as indicated by arrow 102, and flows through a plurality of filters 30 configured to filter the air. Air flows into at least one fan 32 as indicated by arrow 106. As mentioned above, the ventilation air intake system 14 may include one or more fans 32. Each fan 32 includes a motor 108 to drive blades 110 to actively drive air flow through each fan 32. During purge operations to purge the enclosure 18 of heat and exhaust products, the ventilation system 48 (e.g., controller 52) activates at least one fan 32 to direct a first air flow 112 towards the second air intake port 22 and into the enclosure 18. These purge operations may include one or more cycles of purging. Purge operations may span prior to and/or during the startup procedure, but may cease subsequent to ignition of the gas turbine engine 20 after the turbine 20 reaches full speed. After completion of purge operations, the ventilation system 48 (e.g., controller 52) deactivates the at least one fan 32. The deactivated fan 32 may still allow some air to flow through it and towards the second air intake section 22. However, the blades 110 of the fan 32 partially block or restrict ventilation air flow while the fan 32 is not actively driven by the motor 108. As a result, the deactivated fan 32 restricts the ventilation air flow, and creates a substantial pressure drop while not operating. The bypass 12, as discussed below, overcomes this deficiency of the fan 32.

Upon completing purge operations, the ventilation system 14 employs the fan bypass 12 to provide additional air flow into the enclosure 18 via the second air intake section 22. The fan bypass 12 is configured to circumvent the at least one fan 32, as indicated by arrow 115, to provide a second air flow 114 into the gas turbine enclosure 18. The fan bypass 12 includes an actuator 116 (e.g., bypass actuator 116) coupled to a damper or valve 118 (e.g., bypass valve). The actuator 116 (e.g., a drive or biasing element) is configured to open and close the valve 118 to control air flow through the bypass 12. During purge operations, the valve 118 remains in a closed position. However, subsequent to the purging operations and during venting operations, the valve 118 is open to enable additional air flow 114 into the enclosure 18 to vent the enclosure 18 and to cool the gas turbine engine 20. Opening of the bypass 12 for venting operations may occur simultaneously with or subsequent to igniting the gas turbine engine 20. In certain embodiments, the bypass 12 may be opened while the at least one fan 32 remains activated until the turbine engine 20 reaches full speed, then the at least one fan 32 may be deactivated while the bypass 12 remains open. The bypass 12 remains open during the operation of the gas turbine engine 20.

Air flow from the one or more fans 32 and/or the bypass 12 enters the enclosure 18 via the second air intake port 22 as indicated by arrows 114, 120. A guiding vane 121 guides the air flow 114, 120 into the enclosure 18. Upon entering the enclosure 18, the exhaust driven eductor 34 draws the air flow (e.g., the first and/or second air flow) as indicated by arrows 122 through the enclosure 18. The gas turbine enclosure 18 and components of the gas turbine engine 20 (e.g., the turbine 92 and the exhaust section 94) define narrow spaces between the engine 20 and the enclosure 18 near the exhaust stack 36. These narrow spaces form the eductor 34 configured to draw or suction the air flow 122 through and out of the enclosure 18 into the exhaust stack 36 during venting operations. In particular, exhaust gases 100 exiting from the enclosure 18 into the exhaust stack 36 create a vacuum (e.g., via a Venturi effect) that accelerates any air flow 122 present within the enclosure 18 through the eductor 34 and into the flow of exhaust gases 100, as indicated by arrows 124, and through the stack 36. Thus, the exhaust flow drives the eductor 34 to ventilate the enclosure 18 during operation of the gas turbine engine 20 subsequent to purging the enclosure 18.

During purge operations, while the exhaust flow 100 is absent, the one or more fans 32 are configured to draw the first air flow 112 through and out of the enclosure 18, while the bypass 12 remains in a closed position. In certain embodiments, each fan 32 may individually be capable of purge operations, while one or more fans 32 serve as backups. In particular, a rate of air flow generated by each fan 32 may range from approximately 2 to 17, 5 to 15, or 5 to 10 m$^3$/s. For example, the rate of generated air flow by each fan 32 may be approximately 2, 3, 4, 5, 6, 7, 8, 9, 10, 11, 12, 13, 14, 15, 16, or 17 m$^3$/s. In other embodiments, more than one fan 32 (e.g., two fans 32) may be used for purge operations. In certain embodiments, a combined rate of air flow for more than one fan 32 may range from approximately 2 to 17, 5 to 15, or 5 to 10 m$^3$/s. For example, the combined rate of generated air flow by more than one fan 32 may be approximately 2, 3, 4, 5, 6, 7, 8, 9, 10, 11, 12, 13, 14, 15, 16, or 17 m$^3$/s.

Subsequent to purge operations while the exhaust flow 100 is present, the eductor 34 is configured to draw or suction the second air flow 114 through and out of the enclosure 18 into the exhaust flow 100, while the fans 32 may remain deactivated and the bypass 12 is in an open position. The presence of the open bypass 12 enables the fans 32 to be deactivated during venting operations (e.g., after ignition of the engine 20). In addition, the open bypass 12 allows unrestricted air flow into the enclosure 18 to minimize any pressure drop in air flow due to the fans 32 (e.g., motor 108 and blades 110). In certain embodiments, a rate of air drawn or suctioned by the eductor 34 may range from approximately 8 to 25, 10 to 20, or 15 to 20 cubic meters per second (m$^3$/s). For example, the rate may be approximately 8, 9, 10, 11, 12, 13, 14, 15, 16, 17, 18, 19, 20, 21, 22, 23, 24, or 25 m$^3$/s or any number therebetween. The eductor's 34 ability to draw air from the enclosure 18 enables a substantial size reduction in the fans 32. In certain embodiments of the ventilation system 48 with the bypass 12, the size of each fan 32 may be reduced relative to embodiments of the ventilation system 48 without the bypass 12 by approximately 1 to 90, 25 to 75, or 40 to 60 percent. For example, in embodiments of the ventilation system 48 with the bypass 12, each fan 32 may be reduced by approximately 10, 20, 30, 40, 50, 60, 70, 80, or 90 percent, or any number therebetween relative to embodiments of the ventilation system 48 without the bypass 12. Thus, the presence of the bypass 12 and the use of the eductor 34 lower the initial costs and operating costs of gas turbine system 10 by reducing the fan 32 size and eliminating the need for the fans 32 during operation of the gas turbine engine 20. Further, the design of the ventilation system 48 increases the range of ambient temperatures for operating the gas turbine system 10.

Figure 4:
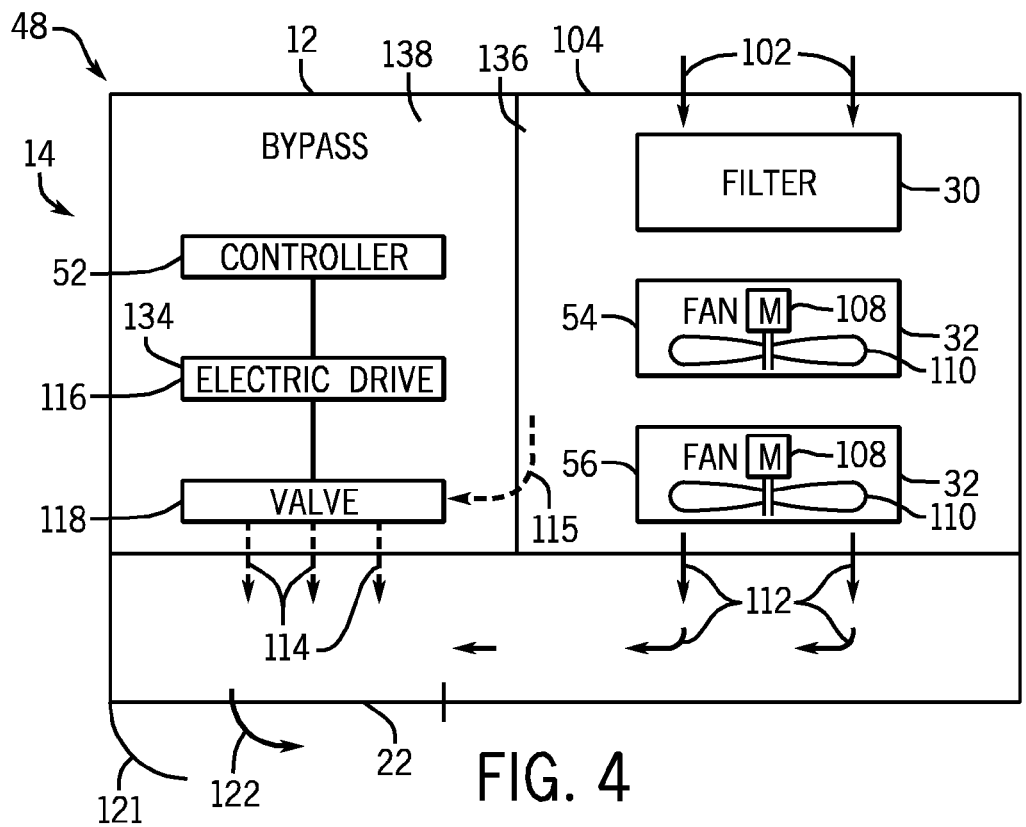
FIG. 4 is a schematic view of an embodiment of a ventilation system with a bypass and multiple fans in series.
Figure 5:
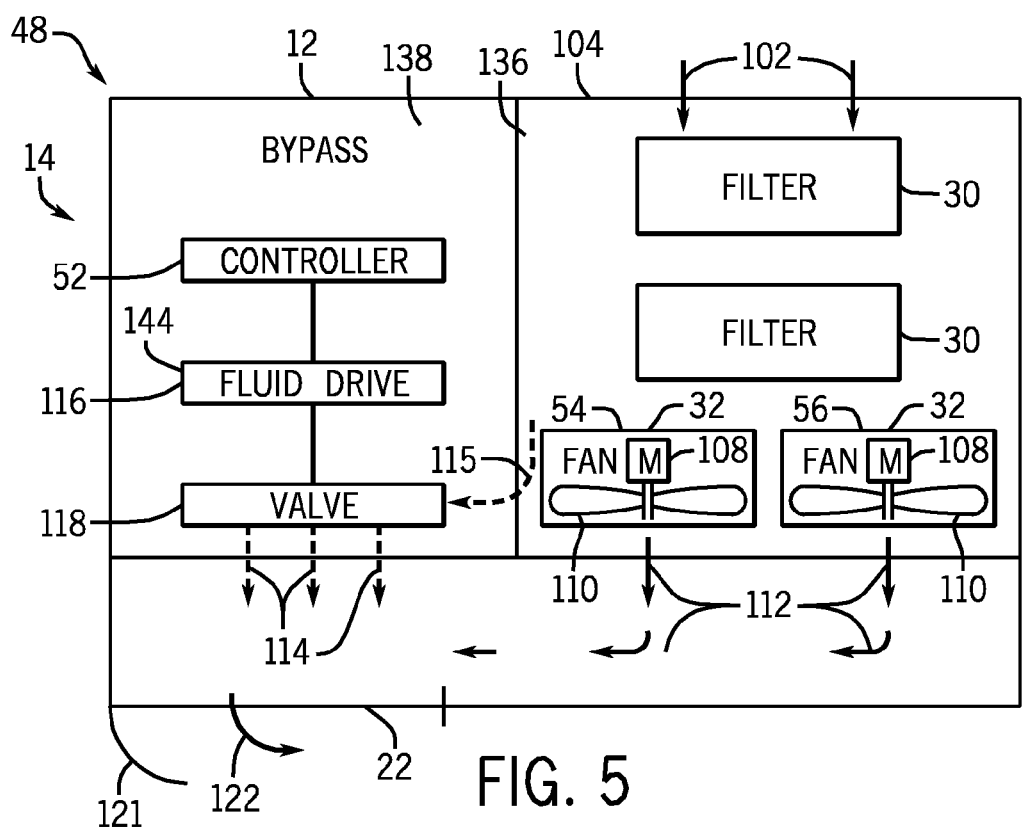
FIG. 5 is a schematic view of another embodiment of a ventilation system with a bypass and multiple fans in parallel.

FIGS. 4 and 5 illustrate different embodiments of the ventilation system 48 with multiple fans 32. FIG. 4 is a schematic view of an embodiment of the ventilation air intake system 14. The ventilation air intake system 14 of FIG. 4 is as generally described in FIG. 3 with a few exceptions. For example, the ventilation air intake system 14 includes a single filter 30. In addition, the system 14 includes two fans 54 and 56, arranged in series, configured to provide the first air flow 112 into the turbine enclosure 18. In certain embodiments, only a single fan 54 or 56 may be activated during purging operations to actively provide the first air flow 112. Alternatively, both fans 54 and 56 may be activated during purging operations to actively provide the first air flow 112. As mentioned above, some air flow 112 occurs through the fans 54 and 56 in their deactivated states as driven by the eductor 34.

As described above, the bypass 12 is configured to circumvent the fans 54 and 56 to provide the second air flow 114 into the enclosure 18. During gas turbine operation, the fans 54 and 56 may not operate unless the bypass 12 fails. If the bypass 12 fails, the fans 54 and 56 may operate together to provide sufficient ventilation air flow along with eductor 34 despite the closure of the bypass 12. The bypass 12 includes the actuator 116 coupled to the damper (e.g., plate) or valve 118. As described in greater detail below, the damper or valve 118 may include one or more movable doors, louvers, plates, or blinds. In addition, the bypass 12 includes the controller 52, as described above, coupled to the actuator 116 of the valve 118 and configured to open or close the valve 118. As illustrated, the actuator 116 includes an electric drive 134 configured to open and close the valve 118 in response to a signal from the controller 52. Opening of the bypass 12 enables air flow 115 from a compartment 136 housing the fans 54 and 56 into a compartment 138 of the bypass 12 to circumvent the fans 54 and 56 to allow additional air flow to minimize a pressure drop in air flow 122 into the enclosure 18.

FIG. 5 is a schematic view of another embodiment of the ventilation air intake system 14 with fans 32 in parallel arrangement. The ventilation air intake system 14 of FIG. 5 is as generally described in FIG. 4 with a few exceptions. For example, the ventilation air intake system 14 includes a plurality of filters 30. In addition, the system 14 includes two smaller fans 54 and 56, arranged in parallel, configured to provide the first air flow 112 into the turbine enclosure 18. In certain embodiments, only a single fan 54 or 56 may be activated during purging operations to actively provide the first air flow 112. Alternatively, both fans 54 and 56 may be activated during purging operations to actively provide the first air flow 112. As mentioned above, some air flow 112 occurs through the fans 54 and 56 in their deactivated states as driven by the eductor 34. As mentioned above, during gas turbine operation, the fans 54 and 56 may not operate unless the bypass 12 fails. If the bypass 12 fails, the fans 54 and 56 may operate together to provide sufficient ventilation air flow along with eductor 34 despite the closure of the bypass 12. In addition, the bypass 12 is as described in FIG. 4 except the actuator 116 includes a fluid drive 144. The fluid drive 116 may operate pneumatically or hydraulically to open or close the valve 118 in response to a signal from the controller 52. For example, the fluid drive 116 may be a gas driven drive 116, such as an air driven drive, a carbon dioxide ($CO_2$) driven drive, or the like. By further example, the fluid drive 116 may be driven by a liquid, such as oil, water, or the like.

Figure 6:
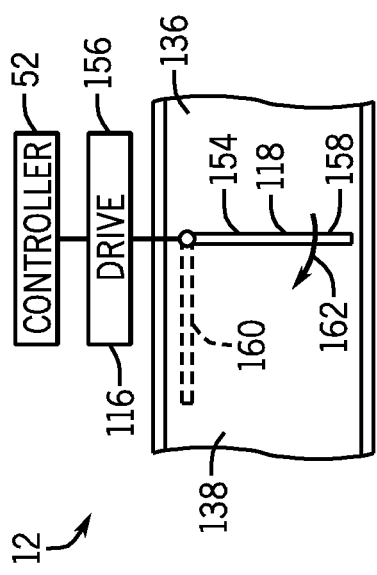
FIG. 6 is a schematic view of an embodiment of a bypass having a single door.

FIGS. 6-9 provide alternative arrangements for the bypass 12. FIG. 6 is a schematic view of an embodiment of the bypass 12 having a single door 154. The bypass 12 includes the controller 52 coupled to a drive 116, 156 (e.g., electric drive or fluid drive). Also, the bypass 12 includes the valve 118 including the door 154. The drive 156 is configured to move the door 154 from a closed position 158 to an open position 160 as indicated by arrow 162 or vice versa. With the door 154 in the open position 160, air flow may enter from the compartment 136 housing the fans 32 into the bypass compartment 138.

Figure 7:
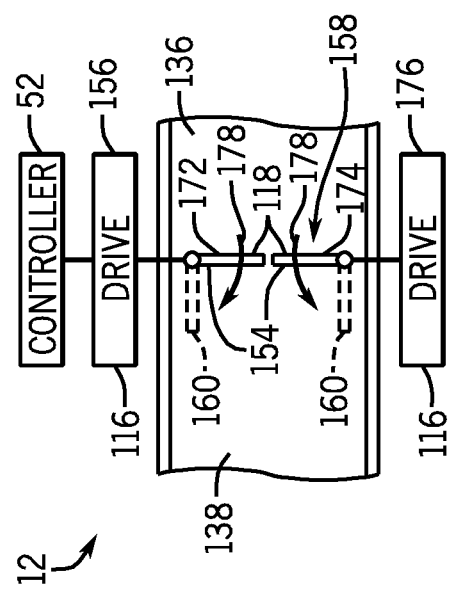
FIG. 7 is a schematic view of an embodiment of a bypass having multiple doors.

FIG. 7 is a schematic view of an embodiment of the bypass 12 having multiple doors 154 (e.g., 172 and 174). The bypass 12 includes the controller 52 coupled to drives 116 (e.g., drives 156 and 176), which may be electric drives or fluid drives. Also, the bypass 12 includes the valve 118 including the doors 154 (e.g., 172 and 174) coupled to drives 156 and 176, respectively. The drives 156 and 176 are each configured to move respective doors 172 and 174 from the closed position 158 to the open position 160 as indicated by arrows 178 or vice versa. With the doors 172 and 174 in the open position 160, air flow may enter from the compartment 136 housing the fans 32 into the bypass compartment 138.

Figure 8:
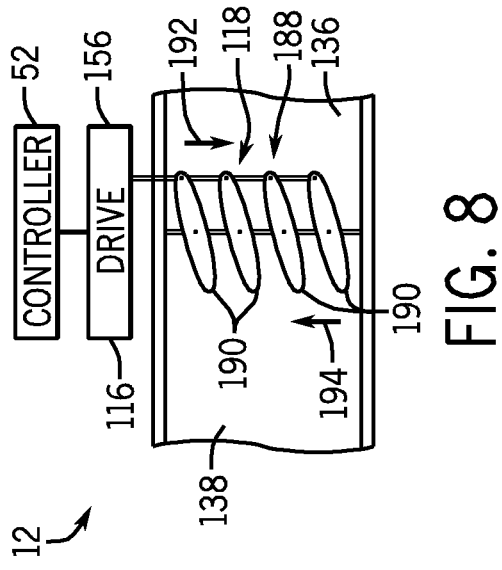
FIG. 8 is a schematic view of an embodiment of a bypass having a plurality of louvers.

FIG. 8 is a schematic view of an embodiment of the bypass 12 having a louver assembly 188. The bypass 12 includes the controller 52 coupled to a drive 116, 156 (e.g., electric drive or fluid drive). Also, the bypass 12 includes the valve 118 including the louver assembly 188 coupled to the drive 116, 156. The louver assembly 188 includes a plurality of rotatable louvers or slats 190. The drive 116, 156 is configured to open the louver assembly 188 (i.e., rotate the slats 190) via actuation of the louver 188 in direction 192 and to close the louver assembly 188 via actuation in direction 194. With the plurality of rotatable slats 190 in the open position, air flow may enter from the compartment 136 housing the fans 32 into the bypass compartment 138.

Figure 9:
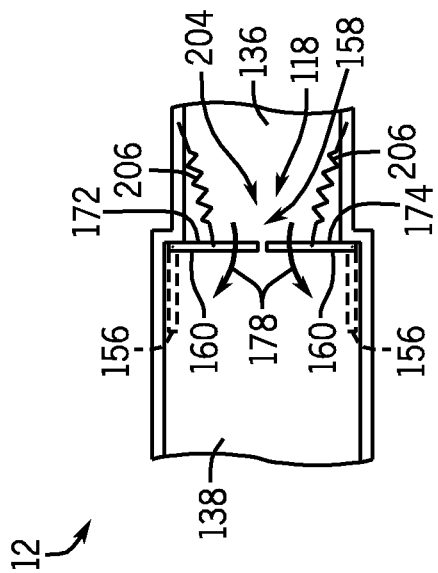
FIG. 9 is a schematic view of an embodiment of a bypass having a check valve assembly with pressure responsive doors.

FIG. 9 is a schematic view of an embodiment of the bypass 12 having a check valve or pressure responsive valve 118, 204. Check valve 204 includes multiple doors 154 (e.g., doors 172 and 174), which are configured to automatically open or close in response to a pressure threshold. The check valve 204 includes a biasing element 206 (e.g., a spring) coupled to each door 172 and 174. The biasing element 206 is configured to bias the valve 118 (e.g., doors 172 and 174) toward the closed position 158 or the open position 160. In particular, the check valve 204 is configured to open automatically, as indicated by arrows 178, in response to an air flow pressure above a threshold. With the doors 172 and 174 in the open position 160, air flow may enter from the compartment 136 housing the fans 32 into the bypass compartment 138. The embodiments of the bypass 12 in FIGS. 6-9, in conjunction with the eductor 34, increase the range of ambient temperatures that the gas turbine systems 10 may operate in and decreases the overall operating costs for the systems 10.

Figure 10:
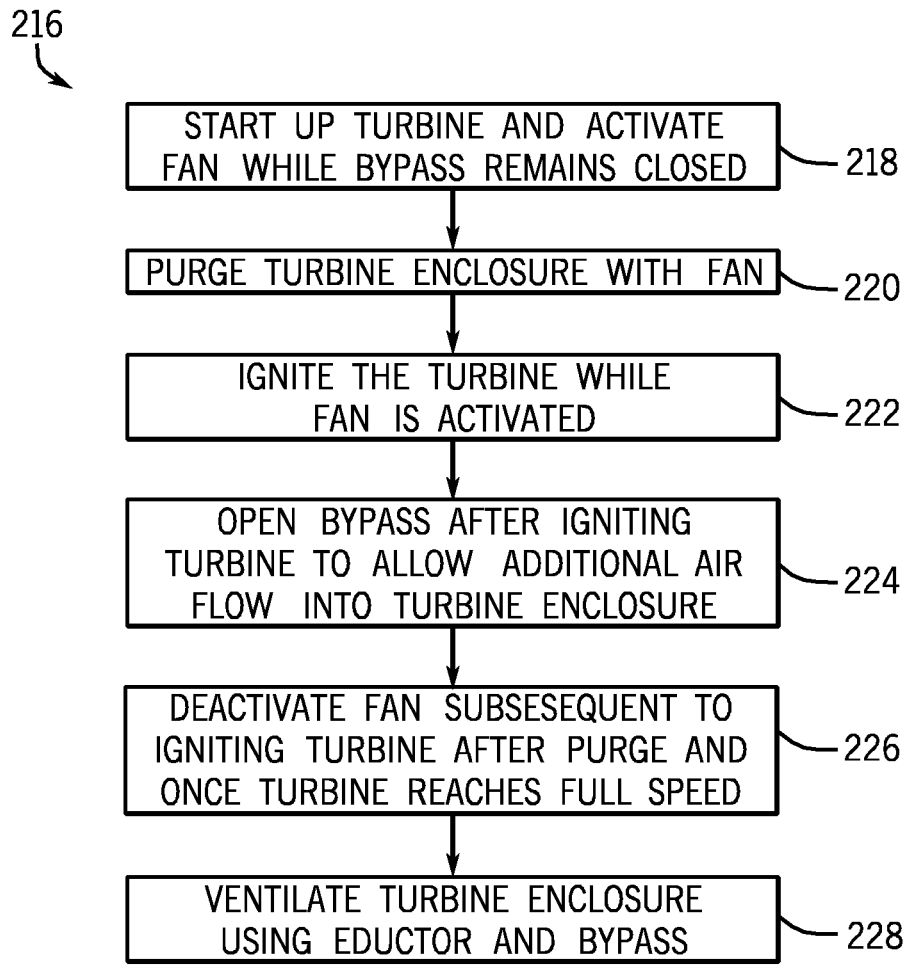
FIG. 10 is a flow chart of an embodiment of a method for purging and ventilating a gas turbine enclosure.

FIG. 10 is a flow chart of an embodiment of a method 216 for purging and ventilating the gas turbine enclosure 18. In certain embodiments, the controller 52 employs the logic described above (e.g., instructions stored on a non-transitory tangible computer readable medium) to implement the method 216. The method 216 includes starting up the gas turbine engine 20 and activating at least one fan 32 while the bypass 12 remains closed (block 218). In certain embodiments, activation of at least one fan 32 occurs at least prior to a startup procedure of the engine 20. In other embodiments, activation of at least one fan 32 occurs simultaneously with the startup procedure of the engine 20. Upon activation of the at least one fan (block 218), purging of the gas turbine enclosure 18 with at least one fan 32 commences (block 220) to purge the enclosure 18 of heat and exhaust products. As mentioned above, purging the enclosure 18 may include multiple purging cycles. The method 216 includes igniting the gas turbine engine 20 while the at least one fan remains activated (block 222). Subsequent to igniting the gas turbine engine 20 (block 222), the method 216 includes opening the bypass 12 to enable additional air flow into the enclosure 18 (block 224). In certain embodiments, the bypass 12 may be opened (block 222) while simultaneously igniting the gas turbine engine (block 222). After the gas turbine engine 20 reaches full speed, the method 216 includes deactivating the at least one fan 32 subsequent to igniting the turbine engine 20. The eductor 34, due to the exhaust generated by the gas turbine engine 20, draws the air flow from the open bypass 12 and any air flow through the deactivated fans 32 through and out of the enclosure 18 to ventilate the enclosure 18 of heat to cool the gas turbine engine 20 (block 226). Thus, the method 218 employing the embodiments described above increases the range of ambient temperatures that the gas turbine system 10 may operate in and decreases the overall operating costs for the system 10.

Technical effects of the disclosed embodiments include providing systems to ventilate enclosures 18 that surround gas turbine engines 20. The ventilation system 48 includes one or more fans 32 that operate to generate an air flow to purge the gas turbine enclosure 18 (e.g., during startup of the gas turbine engine 20). In addition, the ventilation system 48 includes the bypass 12 to circumvent the one or more fans 32 to provide additional air flow into the gas turbine enclosure 18 for ventilation (e.g., after the purging of the gas turbine enclosure 18). The bypass 12 includes the actuator 116 to open and close the valve 118 to control air flow through the bypass 12. Further, the ventilation system 48 includes the eductor 34 that uses the exhaust generated by the gas turbine engine 20 to suction or draw the air flow provided by the fan 32 and/or bypass 12 through and out of the gas turbine enclosure 18. The ventilation system 48 may include controller the 52 that includes logic (e.g., instructions stored on a non-transitory tangible computer readable medium) to control operation of the turbine engine 20 in conjunction with purge and ventilation operations. These systems are designed to increase the efficiency of the ventilation system 48, reduce the size of the fans 32 employed in purging the gas turbine enclosure 18 to reduce initial unit cost, to eliminate the use of the fans 32 subsequent to purging the gas turbine enclosure 18 to reduce operating cost, and to allow the use of the gas turbine systems 10 in higher ambient temperature environments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a gas turbine enclosure;
    a gas turbine engine disposed in the gas turbine enclosure, wherein the gas turbine engine is configured to output an exhaust flow; and
    a ventilation system coupled to the gas turbine enclosure, wherein the ventilation system comprises:
        at least one fan configured to provide a first air flow into the gas turbine enclosure via an air intake port;
        a fan bypass located outside of the gas turbine enclosure upstream of the air intake port and configured to circumvent the at least one fan to provide a second air flow into the gas turbine enclosure via the air intake port;
        wherein the fan bypass comprises an actuator coupled to a valve; an exhaust driven eductor configured to draw the first or second air flows through and out of the gas turbine enclosure using the exhaust flow and wherein the gas turbine enclosure comprises an exit port, and wherein, during the operation of the ventilation system, the first air flow, the second air flow, and the exhaust flow exit the gas turbine enclosure via the exit port.

2. The system of claim 1, wherein the actuator comprises an electric drive.

3. The system of claim 1, wherein the actuator comprises a fluid drive.

4. The system of claim 1, wherein the actuator comprises a biasing element configured to bias the valve toward an open position or a closed position.

5. The system of claim 1, wherein the valve comprises one or more doors.

6. The system of claim 1, wherein the valve comprises a louver assembly comprising a plurality of rotatable slats.

7. The system of claim 1, wherein the fan bypass comprises a check valve configured to open automatically in response to an air flow pressure above a threshold.

8. The system of claim 1, wherein the at least one fan is configured to provide the first air flow into the gas turbine enclosure to purge the gas turbine enclosure at least prior to a startup procedure of the gas turbine engine.

9. The system of claim 1, wherein the exhaust driven eductor is configured to draw the second air flow from the fan bypass through and out of the gas turbine enclosure while the at least one fan is deactivated during operation of the gas turbine engine.

10. The system of claim 1, wherein the system comprises a mobile unit having the gas turbine enclosure, the gas turbine engine, and the ventilation system.

11. The system of claim 1, wherein the exhaust driven eductor is disposed within the gas turbine enclosure.

* * * * *